United States Patent [19]

Asai et al.

[11] Patent Number: 5,428,100
[45] Date of Patent: Jun. 27, 1995

[54] LIQUID CRYSTAL POLYESTER RESIN COMPOSITION AND MOLDED ARTICLE

[75] Inventors: Kuniaki Asai, Tondabayashi; Tadayasu Kobayashi; Mituo Maeda, both of Tsukuba, all of Japan

[73] Assignee: Sumitomo Chemical Company, Limited, Osaka, Japan

[21] Appl. No.: 69,415

[22] Filed: Jun. 1, 1993

[30] Foreign Application Priority Data

Jun. 2, 1992 [JP] Japan ................................. 4-141385
Nov. 20, 1992 [JP] Japan ................................. 4-311786

[51] Int. Cl.$^6$ ........................... C08K 3/04; C08K 3/34; C08K 5/02
[52] U.S. Cl. ..................... 524/496; 524/451; 524/463; 524/601; 524/604; 524/605; 252/511
[58] Field of Search ............... 524/495, 451, 463, 392, 524/496, 601, 604, 605; 252/511

[56] References Cited

U.S. PATENT DOCUMENTS

| | | | |
|---|---|---|---|
| 4,626,557 | 12/1986 | Duska et al. | 523/100 |
| 4,910,284 | 3/1990 | Hijikata et al. | 524/600 |
| 4,983,713 | 1/1991 | Hayashi et al. | 524/601 |
| 5,124,397 | 6/1992 | Kanazawa et al. | 524/496 |
| 5,141,985 | 8/1992 | Asai et al. | 524/494 |
| 5,164,115 | 11/1992 | Asai et al. | 252/511 |
| 5,276,080 | 1/1994 | Oku | 524/440 |
| 5,296,542 | 3/1994 | Layton et al. | 524/601 |

FOREIGN PATENT DOCUMENTS 251237 2/1990 Japan .

*Primary Examiner*—Paul R. Michl
*Assistant Examiner*—Tae H. Yoon
*Attorney, Agent, or Firm*—Cushman Darby & Cushman

[57] ABSTRACT

There are provided a liquid crystal polyester resin composition comprising 100 parts by weight of a liquid crystal polyester, 45 to 80 parts by weight of graphite having an average particle size of 5 μm or more and 0 to 140 parts by weight of talc having an average particle size of 5 μm or more, the total amount of the graphite and the talc being 55 to 185 parts by weight. There are provided a molded article such as a carrier for electronic part, a heat-resistant tray for IC, or the like, which has high heat resistance in soldering, only slight anisotropy and warpage, a surface resistivity of $1 \times 10^4$ to $1 \times 10^8 \Omega$, and an initial voltage due to electrification and a half-life (a time required for the initial voltage due to electrification to be reduced to one-half) which are controlled to be further reduced; and a liquid crystal polyester resin composition excellent in moldability which gives said molded article.

10 Claims, No Drawings

LIQUID CRYSTAL POLYESTER RESIN COMPOSITION AND MOLDED ARTICLE

BACKGROUND OF THE INVENTION

2. Field of the Invention

The present invention relates to molded articles such as a carrier for electronic part, a heat-resistant tray for IC, etc. and liquid crystal polyester resin compositions capable of giving them.

2. Description of the Related Art

In carriers for transport of electronic parts, in particular, trays for transport of IC parts, there have heretofore been used vinyl chloride resins, polystyrene resins, polypropylene resins, etc. to which electroconductivity or antistatic properties have previously been imparted. On the other hand, if an electronic part, in particular, an IC part is wet when mounted on a printed circuit board or the like by soldering, water vapor is generated inside the IC by the heat of soldering, so that blisters or cracks are formed, resulting in breakage of the IC part. Therefore, water should be removed from the IC part at a temperature of 120°–150° C. before the mounting. In this drying step, it has been necessary to transfer the IC part from a transporting tray to an aluminum die-cast tray. However, trays usable both for the transport and for the drying have recently been produced from a modified polyphenylene ether resin to which electroconductivity or antistatic properties have been imparted, and they are coming into wide use.

In addition, there has recently been desired a tray which is usable both for the transport and for the drying and moreover has a high heat resistance which makes it possible to solder an IC part placed in the tray, without transferring the same. For example, development of such a tray by the use of a polyphenylene sulfide resin, a polyether ketone resin or the like as a base material is in progress. However, a product satisfactory with respect to warpage of molded article and moldability has not yet been obtained.

Liquid crystal polyester resins are generally called melt-type liquid crystal (thermotropic liquid crystal) polymers because of the following properties. Even when the resins are in a molten state, molecules of the resin do not entangle with one another because of their stiffness but form a polydomain in crystalline state, and under low shear stress, the resins behave so that the molecular chains are markedly oriented in the direction of flow of a melt. Because of this specific behavior, the liquid crystal polyester resins have a very excellent melt fluidity and depending on their structure, they are not deformed or foamed even at a soldering temperature of 260° C. or higher. Therefore, it is considered that they are usable in a heat-resistant tray for IC when electroconductivity or antistatic properties are imparted to them. However, when the liquid crystal polyester resin is injection-molded, the resulting molded product shows marked orientation in the direction of flow of a melt (hereinafter referred to as MD in some cases). Therefore, the difference between shrinkage percentages in MD and the direction perpendicular to the flow (hereinafter referred to as TD in some cases) is very large, namely, the anisotropy is very remarkable. Accordingly, when the liquid crystal polyester resin is molded into a flat and relatively large product such as an IC tray, warpage has been liable to be caused and no satisfactory product has been obtainable.

It is known that the addition of talc is effective in reducing the anisotropy of the liquid crystal polyester and the warpage. For example, Japanese Patent Application Kokai No. 60-124649 relates to a composition suitable for ovenwares which comprises a blend of a fully aromatic polyester, talc and titanium oxide, and it discloses that the addition of talc reduces the anisotropy of molding shrinkage percentage. The addition of talc, however, deteriorates the mechanical strength greatly. In addition, this reference discloses that although not critical, the average particle size of the talc used is preferably 1 to 10 $\mu$m.

Japanese Patent Application Kohyo No. 1-502833 relates to a composition comprising a blend of a fully aromatic polyester resin, a fibrous reinforcer component represented by glass fiber, and a filler component such as talc, and discloses that there can be obtained a product which shows only slight warpage and has a tensile strength of 10,000 pounds/inch square. But, this reference does not describe the kind of talc, its average particle size, the degree of reduction of warpage, etc.

Japanese Patent Application Kokai No. 4-13758 relates to a composition comprising a blend of a liquid crystal polyester having a melting point of 340° C. or higher and talc having a specific surface area of 5 m$^2$/g or less and an average particle size of 40 $\mu$m or less. By the use of such specified talc, hydrolysis during blending and heat deterioration can be markedly reduced, so that a composition excellent in strength and heat resistance can be obtained. This reference, however, does not describe the reduction of the anisotropy of a molded product and the reduction of warpage.

On the other hand, compositions comprising a liquid crystal polyester and electrically conductive carbon black are known as liquid crystal polyester resin compositions having electroconductivity or antistatic properties. In general, electrically conductive carbon black has a small particle size, a high porosity and a large specific surface area and exhibits electro-conductivity by forming a structure in a molten resin. It, however, is disadvantageous in that it greatly increases the melt viscosity of a melt. Even in the case of a liquid crystal polyester having a very low melt viscosity at molten state, when talc is blended for reducing the anisotropy and warpage of a molded product and electrically conductive carbon black is blended in such an amount that an electroconductivity required of an IC tray (a surface resistivity of $1 \times 10^4$ to $1 \times 10^8$ $\Omega$) is attained, the resulting composition has a markedly increased melt viscosity and the thin portion of the molded product is not sufficiently filled with said composition. Furthermore, the impact strength is greatly decreased.

For the reasons described above, a molded article suitable as a carrier for electronic part, in particular, a heat-resistant tray for IC has not been obtainable merely by blending conventional talc and electrically conductive carbon black with a liquid crystal polyester having a high heat resistance in soldering.

The present invention is intended to provide a molded article such as a carrier for electronic part, a heat-resistant tray for IC, or the like, which has high heat resistance in soldering, only slight anisotropy and warpage, a surface resistivity of $1 \times 10^4$ to $1 \times 10^8$ $\Omega$, and an initial charged voltage due to electrification and a half-life period (a time required for the initial charged voltage due to electrification to be reduced to one-half) which are controlled to be further reduced; and a liquid crystal polyester resin composition excellent in moldability which gives said molded article.

SUMMARY OF THE INVENTION

The present inventors earnestly investigated in order to solve the above problems, and consequently found that the above object can be achieved by blending a specified amount of graphite having an average particle size of 5 μm or more or a combination of said graphite and a fluorocarbon type surfactant, and optionally talc with a liquid crystal polyester, and that molded articles such as a carrier for electronic part, a heat-resistant tray for IC, etc. which are obtained by molding the resulting composition can be used not only for transport and drying but also for soldering, whereby the present invention has been accomplished.

According to a first aspect of the present invention, there is provided a liquid crystal polyester resin composition comprising 100 parts by weight of a liquid crystal polyester, 45 to 80 parts by weight of graphite having an average particle size of 5 μm or more and 0 to 140 parts by weight of talc having an average particle size of 5 μm or more, the total amount of the graphite and the talc being 55 to 185 parts by weight.

According to a second aspect of the present invention, there is provided a liquid crystal polyester resin composition comprising 100 parts by weight of a liquid crystal polyester, 45 to 80 parts by weight of graphite having an average particle size of 5 μm or more, 0.2 to 4.0 parts by weight of a fluorocarbon type surfactant and 0 to 140 parts by weight of talc having an average particle size of 5 μm or more, the total amount of the graphite and the talc being 55 to 185 parts by weight.

According to a third aspect of the present invention, there is provided a molded article such as a carrier for electronic part, a heat-resistant tray for IC, or the like which is obtained by molding the above-mentioned liquid crystal polyester resin composition.

The liquid crystal polyester resin composition of the above first aspect has an excellent moldability and a high heat resistance in soldering and gives a molded article having only slight anisotropy and warpage. Said composition is preferable particularly because it gives a molded article having a surface resistivity of $1 \times 10^4$ to $1 \times 10^8$ Ω. In addition, when generation of static electricity by rubbing of a molded article such as a heat-resistant tray for IC and the persistence of the static electricity are especially undesirable, the liquid crystal polyester resin composition of the above second aspect is preferable because it gives a molded article having an initial charged voltage due to electrification and a half-life period which are controlled to be further reduced. A molded article such as a carrier for electronic part, a heat-resistant tray for IC, or the like which is obtained by molding said liquid crystal polyester resin composition has such excellent characteristics that it can be used not only for transport and drying but also for soldering. The heat-resistant tray for IC can reduce the generation of static electricity by friction or the like and can prevent damage to IC particularly when the heat-resistant trays loaded with IC's are transported on a conveyor in a furnace for drying or soldering or when a pile of a large number of the heat-resistant trays loaded with IC's are transported.

DETAILED DESCRIPTION OF THE INVENTION

The liquid crystal polyester used in the present invention is a polyester belonging to the category of thermotropic liquid crystal polymer and includes, for example, (i) polyesters obtained by the reaction of an aromatic dicarboxylic acid, an aromatic diol and an aromatic hydroxycarboxylic acid with one another, (ii) polyesters obtained by the reaction of different aromatic hydroxycarboxylic acids with each other, (iii) polyesters obtained by the reaction of an aromatic dicarboxylic acid with a nuclearly substituted aromatic diol, and (iv) polyesters obtained by the reaction of a polyester such as polyethylene terephthalate with an aromatic hydroxycarboxylic acid. These liquid crystal polyesters form an anisotropic melt at a temperature of 400° C. or lower.

In place of the above aromatic dicarboxylic acid, aromatic diol and aromatic hydroxycarboxylic acid, their derivatives capable of forming an ester are used in some cases.

As the repeating structural unit of said liquid crystal polyester, the following can be exemplified but the repeating structural unit is not limited thereto.

Repeating structural units derived from aromatic hydroxycarboxylic acids:

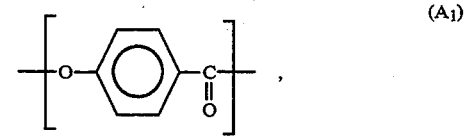  (A₁)

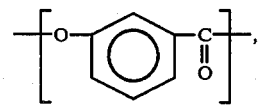

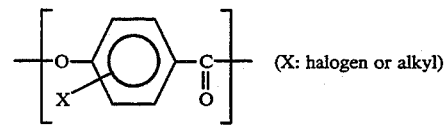  (X: halogen or alkyl)

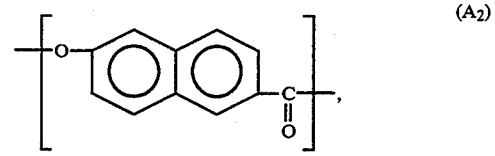  (A₂)

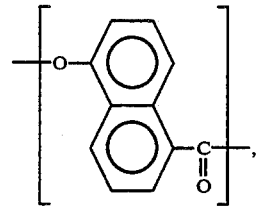

Repeating structural units derived from aromatic dicarboxylic acids:

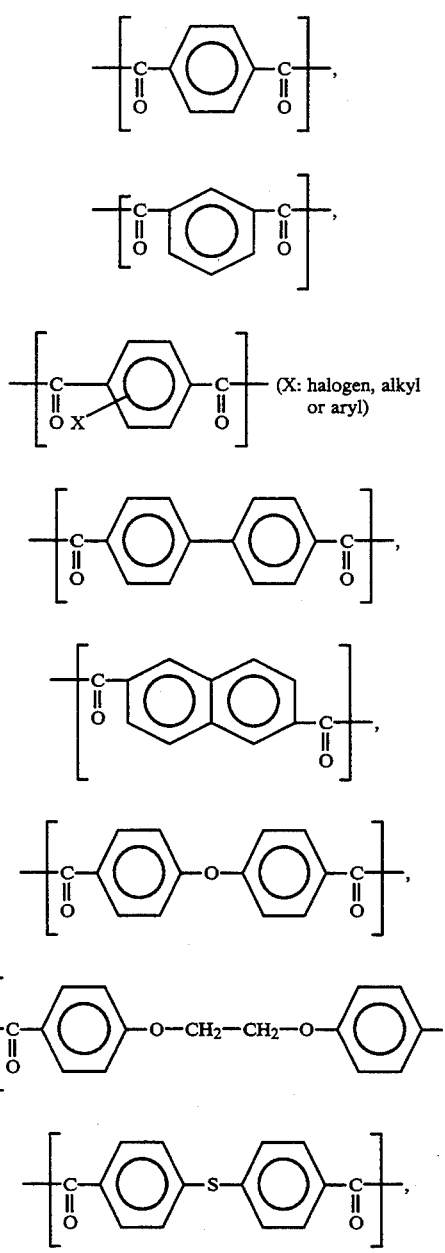
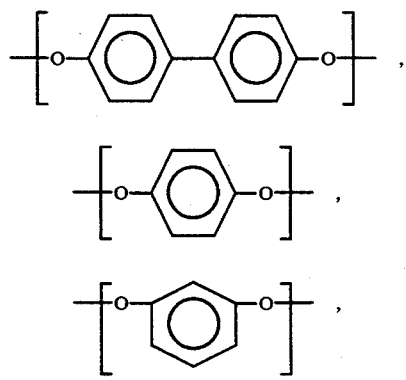
Repeating structural units derived from aromatic diols:
(B₁)
(B₂)
(B₃)
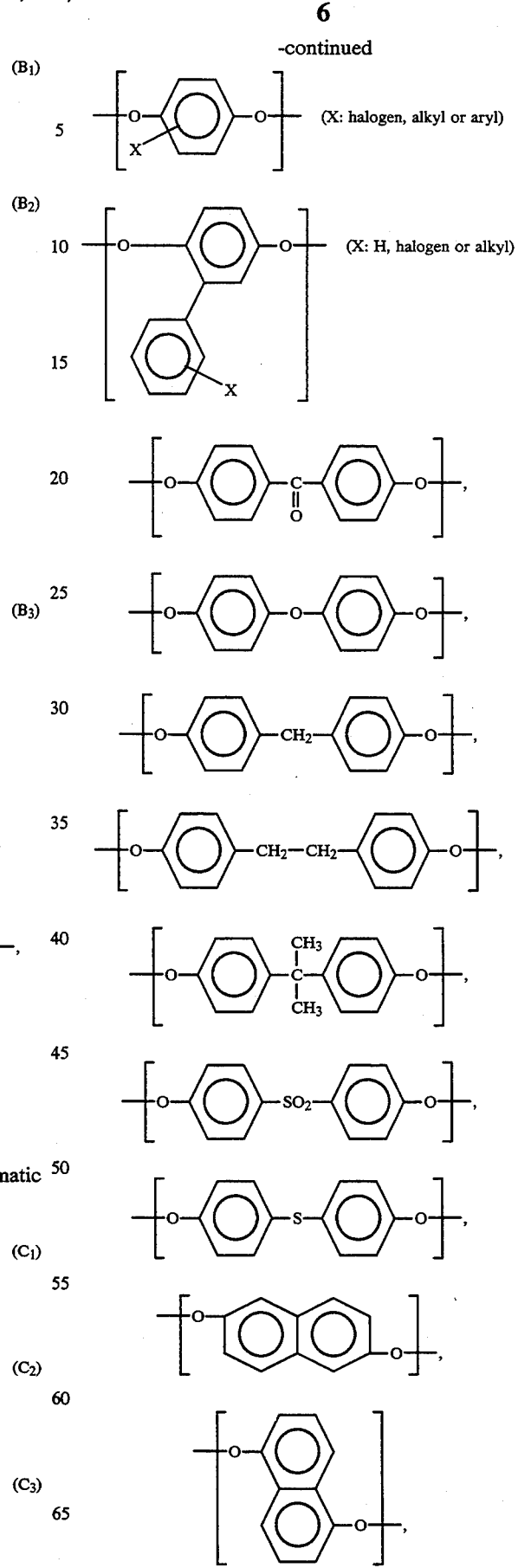

For a good balance in properties such as heat resistance, mechanical properties and processability, the liquid crystal polyester contains structural units of the following formula (A₁) in an amount of preferably at least 30 mole %, more preferably at least 50 mole %, based on the total number of moles of all monomer structural units constituting the liquid crystal polyester:

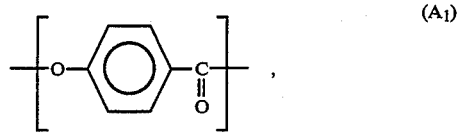

Specific examples of the liquid crystal polyester are those comprising any of the following structural unit combinations (a) to (f):

(a): ($A_1$) ; ($B_1$) or a mixture of ($B_1$)and ($B_2$); and ($C_1$).
(b): ($A_1$)and ($A_2$).
(c): The same structural unit combination as that described in (a) above, except that $A_2$ is used in place of a part of $A_1$.
(d): The same structural unit combination as that described in (a) above, except that $B_3$ is used in place of a part of $B_1$.
(e): The same structural unit combination as that described in (a) above, except that $C_3$ is used in place of a part of $C_1$.
(f): A combination of the structural unit combination described in (b) above and structural units $B_1$ and $C_2$.

Liquid crystal polyesters comprising either of the combinations (a) and (b) which are basic structures are described, for example, in Japanese Patent Application Kokoku Nos. 47-47870 and 63-3888, respectively.

The graphite used in the present invention includes natural scaly graphite, natural earthy graphite, artificial graphite, etc. Natural scaly graphite is preferable. Natural scaly graphite is naturally occurring graphite including mainly graphites having a scalelike, leaflike or needlelike external shape, has a higher fixed carbon content and a lower ash (e.g. $SiO_2$) content than does natural earthy graphite, and is much superior to natural earthy graphite in heat resistance, electric resistance and lubricity. Natural scaly graphite has a high crystallinity and much higher heat resistance and lubricity than does artificial graphite.

As the graphite, there is used one which has a weight average particle size of 5 μm or more. Graphite having a weight average particle size of less than 5 μm is not much less effective in imparting electro-conductivity or antistatic properties to the liquid crystal polyester and reducing the anisotropy of the liquid crystal polyester, than graphite having a weight average particle size of 5 μm or more. But, graphite having a weight average particle size of less than 5 μm is disadvantageous because a composition using such graphite is not sufficiently caught by a screw owing to slip of the composition during melt kneading by means of an extruder or the like. Therefore, metering becomes unstable and the taking-off of an extruded product is unsatisfactory. Moreover, an insufficient improving effect on the impact strength is obtained.

Although not critical, the upper limit of the average particle size is preferably 50 μm or less from the viewpoint of the appearance of the molded article, the uniform-dispersibility in the molded article, etc.

As natural scaly graphite, there are commercially available ones such as CPB-3, CPB-30 and CPB-3000 (trade names, mfd. by Chuetsu Graphite Works Co., Ltd.), CP and CPB (trade names, mfd. by Nippon Kokuen Co., Ltd.), etc.

The talc used in the present invention is white fine powder having a chemical composition represented by $Mg_3(Si_4O_{10})(OH)_2$. Its structure is composed of three layers of $SiO_2$, $Mg(OH)_2$ and $SiO_2$, respectively, and the interlaminar bonding power is weak. Therefore, complete cleavage occurs in the undersurface of the talc, so that the talc tends to be peeled. Accordingly, the talc is generally used as a lubricant.

The weight average particle size of talc is generally 1 to 10 μm. The weight average particle size of the talc used in the present invention is 5 μm or more. As in the case of the graphite, talc having a weight average particle size of less than 5 μm is not much less effective in reducing the anisotropy of the liquid crystal polyester than talc having a weight average particle size of 5 μm or more. But, a composition using talc having a weight average particle size of less than 5 μm is not sufficiently caught by a screw owing to slip of the composition during melt kneading, resulting in unstable metering and unsatisfactory taking-off of an extruded product. Moreover, an insufficient improving effect on the impact strength is obtained. Although not critical, the upper limit of the average particle size is preferably 50 μm or less from the viewpoint of the appearance of the molded article, the uniform-dispersibility in the molded article, etc.

As the talc, there are commercially available ones such as X-50 (a trade name, mfd. by Nihon Talc, Ltd.), TALCAN POWDER PK-C, TALCAN HAYASHI NN (a trade name, mfd. by HAYASHI KASEI CO, LTD), etc.

As to the blending amounts of the graphite and the talc, 45 to 80 parts by weight of the graphite having an average particle size of 5 μm or more and 0 to 140 parts by weight of the talc having an average particle size of 5 μm or more are blended with 100 parts by weight of the liquid crystal polyester, and the total amount of the graphite and the talc is 55 to 185 parts by weight, preferably 65 to 150 parts by weight.

With an increase of the amount of the graphite blended with the liquid crystal polyester, the surface resistivity decreases. It becomes $1 \times 10^8$ Ω or less at a blending amount of 45 to 50 parts by weight and becomes $1 \times 10^5$ to $1 \times 10^4$ Ω at a blending amount of 65 to 80 parts by weight. When the blending amount exceeds 80 parts by weight, the decrease of the surface resistivity hits the ceiling. However, with an increase of the blending amount, metering during melt kneading becomes unstable, the taking-off of an extruded product becomes very unsatisfactory, and the impact resistance of the resulting molded article is lowered. Therefore, the blending amount of the graphite is preferably 45 to 80 parts by weight, more preferably 55 to 70 parts by weight, per 100 parts by weight of the liquid crystal polyester from the following two points of view: an electroconductivity or antistatic properties level required of a carrier for electronic part, in particular, a tray for IC, namely, a surface resistivity of $1 \times 10^4$ to $1 \times 10^8$ Ω; and melt kneadability.

On the other hand, with an increase of the blending amount of the graphite, the anisotropy and ease of warping of a liquid crystal polyester molded article obtained from the composition decrease. The necessity for the talc depends on the thickness and size of a carrier for electronic part, in particular, a tray for IC. For example, when the thickness is large and the size is relatively small, the warpage of the molded article such as carrier, tray or the like is within the maximum permissible limit even in the case of blending the graphite but not the talc, so long as the blending amount of the graphite is 55 parts by weight or more per 100 parts by weight of the liquid crystal polyester.

However, as a common molded article such as a carrier, tray or the like which has a small thickness and a relatively large size, a product sufficiently prevented from warping cannot be obtained by blending the graphite alone because the blending amount of the graphite is, as described above, 80 parts by weight or less per 100 parts by weight of the liquid crystal polyester from the view-point of melt kneadability. Therefore, the talc should be blended with the liquid crystal polyester in addition to the graphite. In this case, the total amount of the graphite and the talc should be at least 55 parts by weight per 100 parts by weight of the liquid crystal polyester. When the total amount is less than 55 parts by weight, serious anisotropy and warpage are caused. When the total amount exceeds 185 parts by weight, the melt fluidity of the composition is low, so that no satisfactory extruded product can be obtained. An extruded product obtained from such a composition is too brittle to be put into practical use as a carrier for electronic part or a heat-resistant tray for IC.

The upper limit of blending amount of the talc is calculated to be 140 parts by weight from the minimum necessary blending amount of the graphite (45 parts by weight) and the upper limit of total amount of the graphite and the talc (185 parts by weight).

The fluorocarbon type surfactant used in the present invention is a fluorocarbon having a hydrophilic group and is neither gasified to be evaporated, nor carbonized to exert an undesirable influence on the thermal stability of the resin composition of the present invention, even at a high temperature of 300°–400° C. which is a processing temperature of said composition. When the thermal stability of said fluorocarbon surfactant is expressed in terms of a weight loss at 350° C. measured in thermogravimetric analysis at a heating rate of 10° C./min under nitrogen, the smaller the weight loss at 350° C. becomes, the more preferable it is. When the weight loss at 350° C. is about 10% by weight or less, no trouble is caused in processing of said composition.

As such a surfactant, there are commercially available surfactants such as Flurad FC-95 and FC-98 (potassium salts of perfluoroalkylsulfonic acid, trade names, mfd. by 3M Co., Ltd.), Flurad FC-124 (a lithium salt of trifluoromethanesulfonic acid, a trade name, mfd. by 3M Co., Ltd.), Ftergent 100 and 110 (sulfonates of highly branched perfluorocarbon, trade names, mfd. by Neos Co., Ltd.), etc.

The blending amount of the fluorocarbon type surfactant is preferably 0.2 to 4.0 parts by weight, more preferably 0.5 to 3.0 parts by weight, per 100 parts by weight of the liquid crystal polyester. When the blending amount is less than 0.2 part by weight, a reducing effect on the initial charged voltage due to electrification and the half-life period is hardly obtained. When the blending amount exceeds 4.0 parts by weight, the reducing effect is not markedly enhanced and moreover the mechanical strength of a molded product of said composition is decreased.

The composition of the present invention may contain one or more conventional additives such as antioxidants, heat stabilizers, ultraviolet absorbers, colorants (e.g. dyes and pigments), etc., fibrous or needlelike reinforcing materials such as glass fiber, silica-alumina fiber, wollastonite, potassium titanate whisker, aluminum borate whisker, etc., mold release agents such as fluororesins. Particularly when a fluororesin such as polytetrafluoroethylene (hereinafter abbreviated as PTFE in some cases) of lubricant grade is added, the release of the composition from a mold is improved at the time of molding. Therefore, when a molded article such as a carrier for electronic part, a heat-resistant tray for IC or the like is obtained by molding the composition, deformation at the time of release from the mold can be prevented, so that a more slightly warped product can be obtained. Of such fluororesins, there is preferably used low-molecular-weight PTFE which is obtained by fluorination to the end of the molecule and has a flow temperature of 350° C. or lower as measured by the method described below. As the PTFE, there are commercially available ones such as Cefral lube I and IP (mfd. by Central Glass Co., Ltd.).

Flow temperature: a temperature at which when a capillary rheometer having a nozzle with an inside diameter of 1 mm and a length of 10 mm is used and a melt obtained by heating is extruded through the nozzle at a heating rate of 4° C./min under a load of 100 kg/cm$^2$, the melt viscosity is 48,000 poise.

A blending means for obtaining the composition of the present invention is not critical. The blending is carried out usually by mixing the liquid crystal polyester, the graphite, the fluorocarbon type surfactant, the talc and optionally the above-mentioned additives, fibrous or needlelike reinforcing materials, fluororesins and the like in a Henschel mixer, tumbling mixer or the like, and then melt-kneading the mixture by means of an extruder.

Examples of the present invention are described below but they are not intended in any way to limit the scope of the present invention. The physical properties in the examples were measured by the following methods:

Anisotropy of molding shrinkage percentage:

Test pieces 64 mm square and 3 mm thick were shaped out of the composition of the present invention, and the molding shrinkage percentages in the direction of flow (MD) and the direction perpendicular to the flow (TD) were measured. The smaller the difference between the percentages, the less the anisotropy.
Izod impact strength:

Flexural test pieces (127×12.7×6.4 mm) were shaped and then divided into two halves. The test pieces were used for measuring Izod impact strength. Izod impact strength was measured according to ASTM D-256.

Deflection temperature under load (TDUL):

Measured according to ASTM D-648 by the use of the flexural test pieces.

Heat resistance in soldering:

JIS No. 1 (½) dumbbell specimens of 0.8 mm in thickness were shaped. Some of them were immersed in a bath of molten solder at 260° C. consisting of 60% of tin and 40% of lead, kept therein at the same temperature for 60 seconds, and then taken out of the bath, and their appearance was observed. Thereafter, the temperature of said bath of molten solder was raised several times by 10° C. at a time, and the same test as above was carried out at each temperature. The highest temperature at which the specimen was foamed or deformed was measured. For example, when the specimen was foamed or deformed for the first time at 310° C., its heat resistance in soldering is 300° C.

Surface resistivity:

Measured at a voltage of 250 V by means of an insulation resistance meter (Model SE-10, mfd. by Toa Denpa Kogyo K.K.) by using the test piece for measuring the anisotropy of molding shrinkage percentage. Initial charged voltage due to electrification, and half-life period:

The test piece for measuring the anisotropy of molding shrinkage percentage was placed on the turntable of STATIC HONESTMETER (Model S-5109, mfd. by Shishido Seidenki K.K.). The distance between the top surface of the test piece and the tip of the needle electrode of an applicator and the distance between the top surface of the test piece and the electrode of an electricity receiver were adjusted to 20 mm. The test piece was electrified for 5 seconds by corona electrical charging (applied voltage: 10 KV) while turning the table. Then, the application was stopped and the initial charged voltage due to electrification and the half-life period (a time required for the initial charged voltage due to electrification to be reduced to one-half) were measured.

Flow temperature:

A temperature at which when a capillary rheometer having a nozzle with an inside diameter of 1 mm and a length of 10 mm is used and a melt obtained by heating is extruded through the nozzle at a heating rate of 4° C./min under a load of 100 kg/cm$^2$, the melt viscosity is 48,000 poise.

Examples 1 and 2 and Comparative Examples 1 to 5

A liquid crystal polyester comprising repeating structural units ($A_1$), ($B_1$), ($B_2$) and ($C_1$) in a ratio of 60:15:5:20 and having a flow temperature of 323° C. and natural scaly graphite having an average particle sizeof 21 μm, 8.5 μm or 4.0 μm were mixed in the proportions shown in Table 1. Test pieces for measuring the anisotropy of molding shrinkage percentage, flexural test pieces and JIS No. 1 (⅛) dumbbell specimens were shaped out of each of the thus obtained mixtures with a twin-screw extruder (PCM-30, mfd. by Ikegai Iron Works, Ltd.) at a cylinder temperature of 350°–360° C. and a mold temperature of 130° C. Using them, there were measured the anisotropy of molding shrinkage percentage, Izod impact strength, deflection temperature under load, heat resistance in soldering, surface resistivity, initial voltage due to electrification, and half-life. The results obtained are shown in Table 1.

It is clear that compared with the composition consisting of the liquid crystal polyester alone (Comparative Example 1), the compositions of the present invention obtained by using natural scaly graphite having an average particle size of 5 μm or more have electroconductivity or antistatic properties, possess reduced anisotropy of molding shrinkage percentage and good moldability, and maintain the high values of deflection temperature under load and heat resistance in soldering of the liquid crystal polyester. In the case of the compositions of the present invention, the initial charged voltage due to electrification was reduced but the half-life period was not reduced.

On the other hand, compared with the compositions using natural scaly graphite having an average particle size of 5 μm or more, the composition using natural scaly graphite having an average particle size of less than 5 μm (Comparative Example 2) was not sufficiently caught by a screw, resulting in unstable metering, very unsatisfactory taking-off of an extruded product, and a low value of Izod impact strength.

Even when natural scaly graphite having an average particle size of 5 μm or more was used, the composition obtained by blending the graphite in an amount of less than 45 parts by weight per 100 parts by weight of the liquid crystal polyester (Comparative Example 3) had a surface resistivity of as high as $4 \times 10^{13}$ Ω. The composition obtained by blending the graphite in an amount of less than 55 parts by weight (Comparative Example 4) had a surface resistivity of less than $1 \times 10^8$ Ω but had more anisotropy than did the compositions of the present invention. The composition obtained by blending said graphite in an amount of more than 80 parts by weight (Comparative Example 5) was much inferior in melt kneadability to the compositions of the present invention.

TABLE 1

| | Composition (parts by weight) | | Melt[1] knead-ability | Molding shrinkage percent-age (%) | | Izod impact strength (kg·cm/cm) | Deflection temperature under load (°C.) | Heat resistance in soldering (°C.) | Surface resistivity (Ω) | Initial charged voltage due to electrification (V) | Half-life period (sec) |
|---|---|---|---|---|---|---|---|---|---|---|---|
| | Liquid crystal polyester | Natural scaly graphite (average particle size) | | MD | TD | | | | | | |
| Example 1 | 100 | 65 (8.5 μm) | ○~△ | 0.23 | 0.49 | 36 | 255 | 300 | $9 \times 10^4$ | 70 | >120 |
| Example 2 | 100 | 65 (21 μm) | ○ | 0.23 | 0.53 | 30 | 252 | 300 | $1 \times 10^5$ | 75 | >120 |
| Comparative Example 1 | 100 | — | ○ | 0.13 | 1.45 | 65 | 263 | 300 | $>1 \times 10^{16}$ | 2000 | >120 |
| Comparative Example 2 | 100 | 65 (4.0 μm) | x | 0.22 | 0.56 | 7 | 250 | 290 | $7 \times 10^4$ | — | — |
| Comparative Example 3 | 100 | 40 (8.5 μm) | ○ | 0.15 | 0.75 | 57 | 258 | 300 | $4 \times 10^{13}$ | — | — |
| Comparative Example 4 | 100 | 50 (8.5 μm) | ○ | 0.18 | 0.66 | 48 | 256 | 300 | $4 \times 10^7$ | — | — |
| Comparative Example 5 | 100 | 85 (8.5 μm) | x | 0.28 | 0.42 | 18 | 253 | 300 | $3 \times 10^4$ | — | — |

TABLE 1-continued

| | Composition (parts by weight) | | | Molding shrinkage percentage (%) | | Izod impact strength (kg · cm/ cm) | Deflection temperature under load (°C.) | Heat resistance in soldering (°C.) | Surface resistivity (Ω) | Initial charged voltage due to electrification (V) | Half-life period (sec) |
|---|---|---|---|---|---|---|---|---|---|---|---|
| | Liquid crystal polyester | Natural scaly graphite (average particle size) | Melt[1] kneadability | MD | TD | | | | | | |
| Example 5 | | | | | | | | | | | |

○: Good
Δ: Metering was somewhat unstable and the take-off rate of an extruded product was somewhat low.
x: Metering was unstable and the taking-off of an extruded product was very bad.

TABLE 2

| | Composition (parts by weight) | | | Melt kneadability | Molding shrinkage percentage (%) | | Izod impact strength (kg · cm/cm) |
|---|---|---|---|---|---|---|---|
| | Liquid crystal polyester | Natural scaly graphite (average particle size) | Talc (average particle size) | | MD | TD | |
| Example 3 | 100 | 45 (21 μm) | 25 (13 μm) | ○ | 0.21 | 0.52 | 34 |
| Example 4 | 100 | 50 (21 μm) | 50 (13 μm) | ○ | 0.24 | 0.37 | 19 |
| Example 5 | 100 | 60 (21 μm) | 40 (13 μm) | ○ | 0.25 | 0.36 | 18 |
| Example 6 | 100 | 60 (8.5 μm) | 40 (13 μm) | ○~Δ | 0.25 | 0.35 | 20 |
| Example 7 | 100 | 60 (21 μm) | 40 (6.5 μm) | ○~Δ | 0.25 | 0.38 | 16 |
| Example 8 | 100 | 70 (21 μm) | 30 (13 μm) | ○ | 0.25 | 0.35 | 17 |
| Example 9 | 100 | 60 (21 μm) | 90 (13 μm) | Δ | 0.20 | 0.31 | 13 |
| Comparative Example 6 | 100 | 60 (21 μm) | 40 (2.8 μm) | x | 0.27 | 0.43 | 9 |
| Comparative Example 7 | 100 | 45 (21 μm) | 5 (13 μm) | ○ | 0.17 | 0.68 | 42 |
| Comparative Example 8 | 100 | 70 (21 μm) | 130 (13 μm) | xx | — | — | — |
| Comparative Example 9 | 100 | 30 (21 μm) | 70 (13 μm) | ○ | 0.25 | 0.35 | 10 |

| | Deflection temperature under load (°C.) | Heat resistance in soldering (°C.) | Surface resistivity (Ω) | Initial charged voltage due to electrification (V) | Half-life period (sec) |
|---|---|---|---|---|---|
| Example 3 | 256 | 300 | $8 \times 10^7$ | — | — |
| Example 4 | 254 | 300 | $2 \times 10^7$ | — | — |
| Example 5 | 253 | 300 | $3 \times 10^6$ | 100 | >120 |
| Example 6 | 254 | 300 | $1 \times 10^6$ | — | — |
| Example 7 | 252 | 300 | $3 \times 10^6$ | — | — |
| Example 8 | 254 | 300 | $5 \times 10^5$ | 60 | >120 |
| Example 9 | 251 | 300 | $4 \times 10^6$ | — | — |
| Comparative Example 6 | 248 | 290 | $2 \times 10^6$ | — | — |
| Comparative Example 7 | 257 | 300 | $7 \times 10^7$ | — | — |
| Comparative Example 8 | — | — | — | — | — |
| Comparative Example 9 | 254 | 300 | $6 \times 10^{14}$ | — | — |

○: Good
Δ: Metering was somewhat unstable and the take-off rate of an extruded product was somewhat low.
x: Metering was unstable and the taking-off of an extruded product was very bad.
xx: No extruded product to be molded could be obtained.

TABLE 3

| | Composition (parts by weight) | | | Melt[1] kneadability | Molding shrinkage percentage (%) | | Izod impact strength (kg · cm/cm) | Deflection temperature under load (°C.) | Heat resistance in soldering (°C.) | Surface resistivity (Ω) |
|---|---|---|---|---|---|---|---|---|---|---|
| | Liquid crystal polyester | Talc (average particle size: 13 μm) | Electrically conductive carbon black | | MD | TD | | | | |
| Comparative Example 10 | 100 | 46 | 7.7 | Δ~x | 0.52 | 0.72 | 7 | 234 | 280 | $8 \times 10^4$ |
| Comparative | 100 | 73 | 9.1 | Δ~x | 0.52 | 0.65 | 4 | 223 | 270 | $2 \times 10^4$ |

TABLE 3-continued

| | Composition (parts by weight) | | | Molding shrinkage percentage (%) | | Izod impact strength (kg·cm/cm) | Deflection temperature under load (°C.) | Heat resistance in soldering (°C.) | Surface resistivity (Ω) |
|---|---|---|---|---|---|---|---|---|---|
| Liquid crystal polyester | Talc (average particle size: 13 μm) | Electrically conductive carbon black | Melt[1] kneadability | MD | TD | | | | |
| Example 11 | | | | | | | | | |

○: Good
Δ: Metering was somewhat unstable and the take-off rate of an extruded product was somewhat low.
x: Metering was somewhat unstable and the taking-off of an extruded product was very bad.

Examples 3 to 9 and Comparative Examples 6 to 9

The same liquid crystal polyester as used in Examples 1 and 2, natural scaly graphite having an average particle size of 21 μm or 8.5 μm and talc having an average particle size of 13 μm, 6.5 μm or 2.8 μm were mixed in the proportions shown in Table 2, and the same experiment as in Examples 1 and 2 was carried out.

The compositions of the present invention obtained by blending talc with an average particle size of 5 μm or more in addition to natural scaly graphite with an average particle size of 5 μm or more had a surface resistivity, initial charged voltage due to electrification, half-life period and heat resistance in soldering which were equal to those of the compositions of the present invention obtained by blending natural scaly graphite alone. The increase of the total blending amount further reduced the anisotropy but did not deteriorate the moldability.

On the other hand, even when the total amount of graphite and talc was 55 to 185 parts by weight per 100 parts by weight of the liquid crystal polyester, the composition obtained by blending talc having an average particle size of less than 5 μm (Comparative Example 6) was inferior in melt kneadability and impact strength to the compositions of the present invention (Examples 5 to 7).

The composition obtained by blending graphite and talc in a total amount of less than 55 parts by weight per 100 parts by weight of the liquid crystal polyester (Comparative Example 7) had more anisotropy than did the compositions of the present invention. The composition obtained by blending graphite and talc in a total amount of more than 185 parts by weight (Comparative Example 8) was very brittle and could not give an extruded product to be molded.

When the total amount of graphite and talc was 55 to 185 parts by weight but the blending amount of graphite was less than 45 parts by weight, the surface resistivity was as very high as $6 \times 10^{14}$ Ω (Comparative Example 9).

Comparative Examples 10 and 11

The same liquid crystal polyester as used in Examples 1 and 2, talc with an average particle size of 13 μm, and electrically conductive carbon black having a DBP (dibutyl phthalate) adsorption capacity of 480 ml/100 g (Ketjen Black EC$_{600}$ DJ, mfd. by Lion Akzo Co., Ltd.) were mixed in the proportions shown in Table 3, and the same experiment as in Examples 1 and 2 was carried out.

Compared with the compositions of the present invention, the compositions obtained by blending the talc and the electrically conductive carbon black (Comparative Examples 10 and 11) had a lower melt kneadability and a much lower fluidity in molding. They had less anisotropy but higher molding shrinkage percentages. In addition, they had lower impact strength, deflection temperature under load and heat resistance in soldering.

Example 10

An IC tray (a tray with a length of 200 mm, a width of 140 mm and a height of 5 mm in which 20 IC's could be set) was molded out of each of six compositions, i.e, those of Examples 1, 5 and 9 and Comparative Examples 7, 10 and 11 by injection molding. Each of the trays thus obtained was placed on a surface plate and the degree of warpage in its central portion was measured by means of a dial gauge. The results obtained are summarized in Table 4. The injection molding was carried out under the following conditions: cylinder temperature 370° C., mold temperature 130° C., injection rate 55%, injection pressure, 1,200 kg/cm², follow-up pressure 700 kg/cm².

As is clear from Table 4, the more the anisotropy of molding shrinkage percentage, the higher the degree of warpage. For all of the compositions of the present invention, the degree of warpage was within the maximum permissible limit of 1 mm.

On the other hand, for the composition obtained by blending graphite and talc in a total amount of less than 55 parts by weight per 100 parts by weight of the liquid crystal polyester (the composition of Comparative Example 7), the degree of warpage was 1.8 mm. In the case of the compositions obtained by blending talc and electrically conductive carbon black (the compositions of Comparative Examples 10 and 11), the thin portion (0.2 to 0.3 mm thick) of the tray was not filled with said composition, the tray itself was very brittle, and no tray to be subjected to measurement of the degree of warpage could be obtained.

When each of the trays molded out of the compositions of Examples 1, 5 and 9, respectively, was held in a circulating hot air dryer at 240° C. for 2 hours, taken out and then cooled to room temperature and the degree of warpage of the tray was measured, the degree of warpage was hardly changed from its value before the drying.

Examples 11 and 12

The same liquid crystal polyester as used in Examples 1 and 2, natural scaly graphite having an average particle size of 21 μm or 8.5 μm, and Flurad FC-95 (a fluorocarbon type surfactant, a trade name, mfd. by 3M Co., Ltd.) were mixed in the proportions shown in Table 5, and the same experiment as in Examples 1 and 2 was carried out.

TABLE 4

| | Composition (parts by weight) | | | | Molding shrinkage percentage (%) | | Degree of warpage of a tray for IC |
|---|---|---|---|---|---|---|---|
| | Liquid crystal polyester | Natural scaly (average particle size) | Talc (average particle size) | Electrically conductive carbon black | MD | TD | |
| Composition of Example 1 | 100 | 65 (8.5 μm) | — | — | 0.23 | 0.49 | 0.65 |
| Composition of Example 5 | 100 | 60 (21 μm) | 40 (13 μm) | — | 0.25 | 0.36 | 0.41 |
| Composition of Example 9 | 100 | 60 (21 μm) | 90 (13 μm) | — | 0.26 | 0.31 | 0.33 |
| Composition of Compar. Example 7 | 100 | 45 (8.5 μm) | 5 (13 μm) | — | 0.17 | 0.68 | 1.8 |
| Composition of Compar. Example 10[1)] | 100 | — | 46 (13 μm) | 7.7 | 0.52 | 0.72 | — |
| Composition of Compar. Example 11[1)] | 100 | — | 73 (13 μm) | 9.1 | 0.52 | 0.65 | — |

[1)]The thin portion of a tray was not filled with the composition and no tray to be subjected to measurement of the degree of warpage could be obtained.

TABLE 5

| | Composition (parts by weight) | | | Melt[1)] kneadability | Molding shrinkage percentage (%) | | Izod impact strength (kg·cm/cm) | Deflection temperature under load (°C.) | Heat resistance in soldering (°C.) | Surface resistivity (Ω) | Initial charged voltage due to electrification (V) | Half-life period (sec) |
|---|---|---|---|---|---|---|---|---|---|---|---|---|
| | Liquid crystal polyester | Natural scaly graphite (average particle size) | Fluorocarbon type surfactant | | MD | TD | | | | | | |
| Example 11 | 100 | 65 (8.5 μm) | 2 | ○~△ | 0.24 | 0.51 | 31 | 250 | 300 | $7 \times 10^4$ | 35 | 6 |
| Example 12 | 100 | 65 (21 μm) | 2 | ○ | 0.25 | 0.52 | 27 | 247 | 300 | $9 \times 10^4$ | 40 | 7 |

○: Good
△: Metering was somewhat unstable and the take-off rate of an extruded product was somewhat low.

The compositions of the present invention had moldability, anisotropy of molding shrinkage percentage, Izod impact strength, deflection temperature under load, heat resistance in soldering, and surface resistivity which were equal to those of the compositions containing no fluorocarbon type surfactant (Examples 1 and 2). In the case of the former compositions, the initial charged voltage due to electrification was reduced and the half-life period was greatly reduced.

Examples 13 to 15

The same liquid crystal polyester as used in Examples 1 and 2, natural scaly graphite having an average particle size of 21 μm, talc having an average particle size of 13 μm, and Flurad FC-95 (a fluorocarbon type surfactant, a trade name) were mixed in the proportions shown in Table 6, and the same experiment as in Examples 1 and 2 was carried out.

The compositions of the present invention had moldability, anisotropy of molding shrinkage percentage, Izod impact strength, deflection temperature under load, heat resistance in soldering, and surface resistivity which were equal to those of the compositions containing no fluorocarbon type surfactant (Examples 5 and 8). In the case of the former compositions, the initial charged voltage due to electrification was reduced and the half-life period was greatly reduced.

Example 16

An IC tray was molded out of each of the compositions of Examples 11, 13 and 15 in the same manner as in Example 10, and the degree of warpage of the tray was measured. The results obtained are summarized in Table 7.

In the trays molded out of the compositions of the present invention, the more the anisotropy of molding shrinkage percentage, the higher the degree of warpage. For all the trays, the degree of warpage was within the maximum permissible limit of 1 mm.

When each tray was held in a circulating hot air dryer at 240° C. for 2 hours, taken out and then cooled to room temperature and the degree of warpage of the tray was measured, the degree of warpage was hardly changed from its value before the drying.

TABLE 6

| | Composition (parts by weight) | | | | | Molding shrinkage percentage (%) | | Izod impact strength (kg·cm/cm) | Deflection temperature under load (°C.) | Heat resistance in soldering (°C.) | Surface resistivity (Ω) | Initial charged voltage due to electrification (V) | Half-life period (sec) |
| | Liquid crystal polyester | Natural scaly graphite (average particle size) | Talc (average particle size) | Fluorocarbon type surfactant | Melt[1] kneadability | MD | TD | | | | | | |
| --- | --- | --- | --- | --- | --- | --- | --- | --- | --- | --- | --- | --- | --- |
| Example 13 | 100 | 60 (21 μm) | 40 (13 μm) | 2 | ○ | 0.25 | 0.36 | 17 | 248 | 300 | $2 \times 10^6$ | 45 | 8 |
| Example 14 | 100 | 70 (21 μm) | 30 (13 μm) | 1 | ○ | 0.26 | 0.37 | 16 | 251 | 300 | $5 \times 10^5$ | 30 | 9 |
| Example 15 | 100 | 70 (21 μm) | 30 (13 μm) | 2 | ○ | 0.25 | 0.34 | 15 | 250 | 300 | $3 \times 10^5$ | 20 | 3 |

○: Good

TABLE 7

| | Composition (parts by weight) | | | | Molding shrinkage percentage (%) | | Degree of warpage of a tray for IC (mm) |
| | Liquid crystal polyester | Natural scaly graphite (average particle size) | Talc (average particle size) | Fluorocarbon type surfactant | MD | TD | |
| --- | --- | --- | --- | --- | --- | --- | --- |
| Composition of Example 11 | 100 | 65 (8.5 μm) | — | 2 | 0.24 | 0.51 | 0.67 |
| Composition of Example 12 | 100 | 60 (21 μm) | 40 (13 μm) | 2 | 0.25 | 0.36 | 0.42 |
| Composition of Example 15 | 100 | 70 (21 μm) | 30 (13 μm) | 2 | 0.25 | 0.34 | 0.40 |

What is claimed is:

1. A liquid crystal polyester resin composition consisting of
100 parts by weight of a liquid crystal polyester,
45 to 80 parts by weight of graphite having an average particle size of 5 μm to 50 μm, and
0 to 140 parts by weight of talc having an average particle size of 5 μm to 50μm, the total amount of the graphite and the talc being 55 to 185 parts by weight.

2. A liquid crystal polyester resin composition consisting of
100 parts by weight of a liquid crystal polyester,
45 to 80 parts by weight of graphite having an average particle size of 5 μm to 50 μm, and
0 to 140 parts by weight of talc having an average particle size of 5 μm to 50μm, the total amount of the graphite and the talc being 55 to 185 parts by weight, and
0.2 to 4.0 parts by weight of a fluorocarbon type surfactant.

3. A liquid crystal polyester resin composition according to claim 1 or 2, wherein the liquid crystal polyester is one which contains structural units represented by the following formula (A₁) in an amount of at least 30 mole % based on the total number of moles of all monomer structural units constituting the liquid crystal polyester:

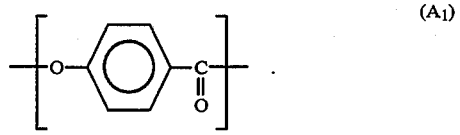

4. A liquid crystal polyester resin composition according to claim 3, wherein the liquid crystal polyester is one which contains structural units represented by the formula (A₁) in an amount of at least 50 mole % based on the total number of moles of all monomer structural units constituting the liquid crystal polyester.

5. A molded article obtained by molding a liquid crystal polyester resin composition according to claim 1.

6. A molded article obtained by molding a liquid crystal polyester resin composition according to claim 2.

7. A molded article according to claim 5 or 6, which is a carrier for electronic part.

8. A molded article according to claim 5 or 6, which is a heat-resistant tray for IC.

9. A molded article according to claim 5 or 6, which has a surface resistivity of $1 \times 10^4$ to $1 \times 10^8$ Ω.

10. A molded article according to claim 5 or 6, which has a surface resistivity of $1 \times 10^4$ to $1 \times 10^8$ ohms and is a heat-resistant tray for IC.

* * * * *